US010702936B2

(12) United States Patent
Weber (10) Patent No.: US 10,702,936 B2
(45) Date of Patent: Jul. 7, 2020

(54) METHOD FOR MACHINING THE TOOTH FLANKS OF BEVEL GEAR WORKPIECES (71) Applicant: Klingelnberg AG, Zürich (CH)

(72) Inventor: Jürgen Weber, Hückeswagen (DE)

(73) Assignee: KLINGELNBERG AG (CH)

(*) Notice: Subject to any disclaimer, the term of this patent is extended or adjusted under 35 U.S.C. 154(b) by 286 days.

(21) Appl. No.: 15/923,656

(22) Filed: Mar. 16, 2018

(65) Prior Publication Data
US 2018/0264568 A1 Sep. 20, 2018

(30) Foreign Application Priority Data

Mar. 17, 2017 (EP) .................................. 17161493

(51) Int. Cl.
B23F 19/05 (2006.01)
B23F 23/12 (2006.01)
B23F 9/10 (2006.01)
B23F 19/00 (2006.01)
B23F 9/02 (2006.01)
B23F 21/22 (2006.01)

(52) U.S. Cl.
CPC ............ *B23F 19/055* (2013.01); *B23F 9/025* (2013.01); *B23F 9/10* (2013.01); *B23F 19/005* (2013.01); *B23F 23/1218* (2013.01); *B23F 21/22* (2013.01)

(58) Field of Classification Search
CPC .... B23F 19/005; B23F 19/10; B23F 23/1218; B23F 21/22
USPC ...................................................... 451/5, 47
See application file for complete search history.

(56) References Cited

U.S. PATENT DOCUMENTS 2,342,232 A 2/1944 Wildhaber
4,694,617 A * 9/1987 Loos ..................... B23F 19/055
409/12

(Continued)

FOREIGN PATENT DOCUMENTS

CN 101027158 A 8/2007
DE 202004004480 U1 6/2004

(Continued)

OTHER PUBLICATIONS

Klingelnberg, J., "Bevel Gear," Springer Vieweg, Berlin, Heidelberg, 2016, pp. 105 and 106.

(Continued)

*Primary Examiner* — George B Nguyen
(74) *Attorney, Agent, or Firm* — McCarter & English, LLP (57) ABSTRACT A method for machining the tooth flanks of a bevel gear workpiece includes carrying out correction machining of a concave tooth flank and a convex tooth flank of at least one tooth gap by, after machining using a first machine setting, cutting free of the concave tooth flank by the bevel gear workpiece executing a workpiece rotation in a first rotational direction having a predefined first absolute value in relation to a gear-cutting tool and/or cutting free the convex flank by the bevel gear workpiece executing a workpiece rotation in another rotational direction having a predefined second absolute value in relation to the gear-cutting tool, and finish machining the concave tooth flank using a second machine setting, which differs from the first machine setting, and finish machining the convex tooth flank using a third machine setting, which differs from the second machine setting.

13 Claims, 4 Drawing Sheets

(56) References Cited

U.S. PATENT DOCUMENTS

| | | | | |
|---|---|---|---|---|
| 4,799,337 A * | 1/1989 | Kotthaus | ............... | B23F 17/001 409/26 |
| 5,645,467 A * | 7/1997 | Schriefer | ............. | B23F 19/007 409/10 |
| 5,800,103 A * | 9/1998 | Stadtfeld | ................ | B23F 9/025 409/27 |
| 8,807,890 B2 * | 8/2014 | Hsiao | ................... | B23F 21/226 407/21 |
| 9,199,323 B2 * | 12/2015 | Marx | ...................... | B23F 5/163 |
| 9,339,879 B2 * | 5/2016 | Ando | ...................... | B23F 15/00 |
| 2005/0064794 A1 * | 3/2005 | Blasberg | ................ | B23F 9/025 451/5 |
| 2005/0207858 A1 * | 9/2005 | Muller | ..................... | B23F 9/10 409/8 |
| 2009/0060671 A1 * | 3/2009 | Langerfeld | ............. | B23F 5/205 409/27 |
| 2012/0208436 A1 * | 8/2012 | Muller | ................... | B23F 19/00 451/5 |
| 2012/0321404 A1 * | 12/2012 | Ribbeck | ................... | B23F 9/10 409/13 |
| 2015/0286206 A1 * | 10/2015 | Muller | .................. | B23F 19/025 700/164 |
| 2016/0089735 A1 * | 3/2016 | Stadtfeld | ................ | B23F 9/105 451/47 |
| 2018/0318946 A1 * | 11/2018 | Gsell | .................. | B23F 23/1218 |

FOREIGN PATENT DOCUMENTS

| | | |
|---|---|---|
| DE | 10334493 A1 | 3/2005 |
| DE | 102014015587 A1 | 4/2016 |
| EP | 2535134 A1 | 12/2012 |
| EP | 2923790 A1 | 9/2015 |
| JP | H0215915 A | 1/1990 |

OTHER PUBLICATIONS

Extended European Search Report for European Patent Application No. EP 17161493.6, dated Sep. 13, 2017, 6 pages.

* cited by examiner

METHOD FOR MACHINING THE TOOTH FLANKS OF BEVEL GEAR WORKPIECES

CROSS REFERENCE TO RELATED APPLICATIONS

This application claims priority under 35 U.S.C. §§ 119 (a)-(d) to European patent application no. EP 17 161 493.6 filed Mar. 17, 2017, which is hereby expressly incorporated by reference as part of the present disclosure.

FIELD OF THE INVENTION

The subject matter of the present disclosure relates to a method for machining the tooth flanks of bevel gear workpieces. In particular, it relates to the correction machining of the tooth flanks of plunge-machined bevel gear workpieces.

BACKGROUND

There are greatly varying approaches for the industrial production of bevel gears. Crown gears, as a special form of bevel gears, are frequently produced by a plunging method (also called piercing), in which the profile is generally accurately imaged as a tooth gap in the material of a crown gear workpiece. A corresponding example is shown in schematic form in FIGS. 1A, 1B, and 1C.

This plunging method is a forming method. There are both single-indexing and also continuous-indexing plunging or forming methods. The tool 2 (a cutter head gear-cutting tool 2 here) having bar cutters 3 executes solely a plunging or piercing movement ET in relation to the crown gear workpiece 1 for the milling of the tooth gaps. Most of the methods in this case operate in the two-flank cut, also called completing. In this case, both tooth flanks are finished using one tool and one machine setting (as described in one of the following paragraphs). There are also plunging methods in which the individual flanks are machined separately. However, this is only rarely used in practice.

Figure 1A:
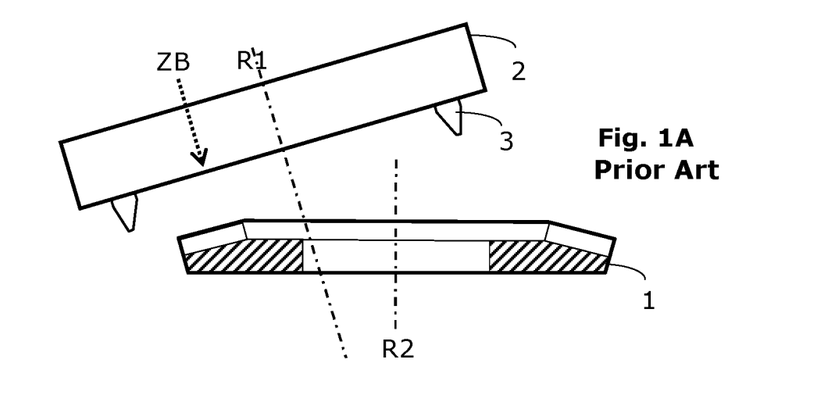
FIG. 1A shows a schematic side view of the machining region of a gear-cutting machine during the gear-cutting milling in a previously-known plunging method, wherein a cutter head tool is shown slightly inclined in relation to the crown gear.
Figure 1B:
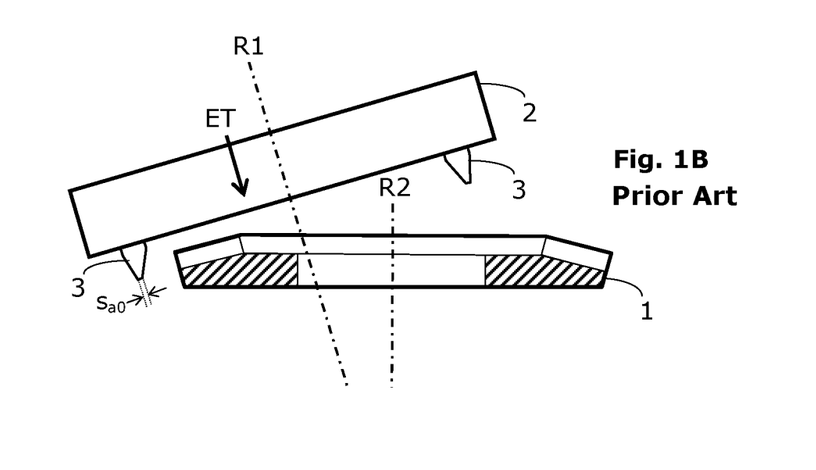
FIG. 1B shows a schematic side view of the cutter head tool and the crown gear of FIG. 1A, after a plunging movement has been executed.

The workpiece spindle axis R2 (also called the workpiece rotational axis R2) is typically inclined in relation to the tool spindle axis R1 (also called the tool rotational axis R1), as indicated in FIGS. 1A and 1B. FIG. 1A shows the situation during the execution of an infeed movement ZB, to move the tool 2 toward the crown gear workpiece 1. FIG. 1B shows a snapshot after the execution of the plunging movement ET. During the plunging, the machine setting of the gear-cutting machine is maintained in the simplest case, since in this case only a linear plunging or piercing movement ET of the tool 2 into the crown gear workpiece 1 takes place. In this case, there is only the plunging advance, which is illustrated in the basic gear-cutting machine by the movement of only one axis. Depending on the construction of the real gear-cutting machine, however, multiple axes of the machine can move. Further details in this regard can be inferred, for example, from document DE10334493 A1.

Figure 1C:
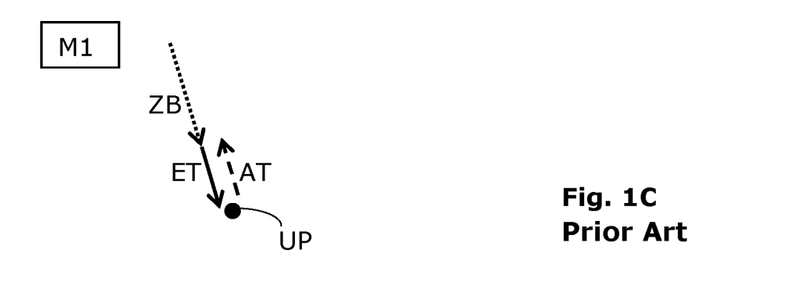
FIG. 1C shows a simplified, schematic illustration of a previously-known plunging method.

FIG. 1C illustrates the known plunging method in simplified schematic form in summary. The dotted arrow illustrates the infeed movement ZB and the solid arrow, which is oriented in the direction of the crown gear workpiece 1 (not shown here), illustrates the plunging movement ET. A dashed arrow having reversed direction is shown in parallel to the solid arrow. This dashed arrow illustrates the withdrawal movement AT. After the tooth base of a tooth gap to be created is reached, a direction reversal takes place. In FIG. 1C, this is shown by the opposing arrows ET and AT and by the reversal point UP. The orientation of the infeed movement ZB does not necessarily have to correspond to the orientation of the plunging movement ET, as shown in FIG. 1C. The symbol M1 is to indicate that the plunging takes place using a first machine setting M1.

The machine setting during the plunging is typically defined by the following variables: radial distance $\varphi$ (also referred to as radial), cradle angle $\alpha$, machine base angle $\gamma$, depth position $\chi$, axial offset $\eta$, inclination angle (tilt) $\tau$ and orientation angle (swivel) $\sigma$, and the distance mccp of the axis intersection point of the crown gear workpiece 1 from the machine center of the gear-cutting machine. All of these variables can be constant during the plunging, as already described. Only the depth position $\chi$ changes, as indicated in FIG. 1B by the arrow ET.

Further details on the plunging of bevel gears can be inferred, for example, from the book "Kegelräder; Grundlagen, Anwendungen [bevel gears; foundations, applications]" of the editor Jan Klingelnberg, 2008, Springer-Verlag, (see, for example, pages 105-106 therein).

Alternatively, crown gears can also be produced by generative methods. In most cases, however, plunging is more productive than generative methods.

It has been shown that topography errors, such as spiral angle, longitudinal crowning, vertical crowning, twist, and flank angle errors can occur in plunge-machined bevel gears 1, i.e., in bevel gears 1 which have been machined by a plunging method. Moreover, tooth thickness and indexing errors can occur. The flank angle errors and the correction thereof are primarily described hereafter, wherein the disclosure herein may also be applied to the other mentioned errors.

Studies have now shown that these flank angle errors are caused, for example, by thermal influences in the gear-cutting machine and by deformations of the crown gear workpieces. Variations, which occur during the regrinding of the bar cutters of the cutter head gear-cutting tools 2, have been identified as a further cause of the occurrence of flank angle errors.

The location, direction, or shape of the mentioned flank angle errors can be defined as positive and negative. They can occur oriented in opposite directions, i.e., the flank angle error of the concave tooth flank has a different sign than that of the convex tooth flank, or oriented in the same direction, the flank angle errors of both tooth flanks have the same sign. Such flank angle errors, which either point in the positive direction on both tooth flanks or in the negative direction on both tooth flanks, cannot be corrected to zero during the plunging by means of correction of the machine settings, since the plunging, as mentioned above, machines the concave and convex tooth flanks using only one machine setting. Because only one machine setting is usually available during the plunging, such flank angle errors can only be averaged via changing the plunging position. However, this is only possible if the flank angle errors are different from the absolute value. The relative position between the gear-cutting tool 2 and the crown gear workpiece 1 is referred to as the plunging position.

SUMMARY OF THE INVENTION

It is therefore an object to provide a method for the industrial production of crown gears, which enables a correction of the flank angle errors even if they point in the positive direction on both tooth flanks of a tooth gap or point in the negative direction on both tooth flanks of a tooth gap. The method may also be applied to other errors.

In one aspect, the method combines finish machining or correction machining of the tooth flanks of a bevel gear workpiece. This combined finish or correction machining comprises part of the cutting free process, in which the tooth flanks of a tooth gap are reworked by executing a workpiece rotation (in the range of a few microradians).

Correction machining of a concave tooth flank is also overlaid on this cutting free, by other variables of the machine setting also being changed in addition to the workpiece rotation. The correction machining of the concave tooth flank takes place in a second machine setting, which differs from the first machine setting used during the plunging.

Correction machining of a convex tooth flank is also overlaid on this cutting free, by other variables of the machine setting also being changed in addition to the workpiece rotation. The correction machining of the convex tooth flank takes place in a third machine setting, which differs from the first machine setting used during the plunging and from the second machine setting.

The cutting free of the concave tooth flank may take place by the bevel gear workpiece executing a workpiece rotation relative to the gear-cutting tool in a first rotational direction having a predefined first absolute value and/or the cutting free of the convex tooth flank takes place by the bevel gear workpiece executing a workpiece rotation relative to the gear-cutting tool in another rotational direction having a predefined second absolute value, to give the tooth gap an enlarged gap width.

The use of the numerals "second" and "third" is not to specify a sequence. The third machine setting can also be applied before the second machine setting.

The combined finish or correction machining (referred to as first modified plunging method) has the advantage that no more time has to be expended than in the classical cutting free, or only insignificantly more time has to be expended. This is because only a transition from the first machine setting into a second machine setting has to take place for the cutting free and correction machining of one tooth flank and a transition from the second machine setting into a third machine setting has to take place for the cutting free and correction machining of the other tooth flank.

However, other embodiments are also possible (referred to as second modified plunging method), in which the cutting free takes place before the respective change of the machine settings. In this case, the cutting free of the two tooth flanks takes place using the first machine setting, which was also used during the plunging, solely by way of a workpiece pivot in both rotational directions. For the correction machining of one tooth flank, a transition from the first machine setting into a second machine setting then takes place and, for the correction machining of the other tooth flank, a transition takes place from the second machine setting into a third machine setting.

The disclosure herein may be applied both to continuously executed plunging methods and also to single-indexing plunging methods. In contrast to single-indexing plunging methods, in the continuous-indexing method, the bevel gear workpiece is rotationally driven in a coupled manner in addition to the rotational driving of the gear-cutting tool.

During the cutting free and during the finish machining/correction machining, at least the gear-cutting tool is also rotationally-driven for the purpose of removing chips.

It is an advantage of at least some embodiments that the machining in the plunging method and the correction machining take place without re-chucking the bevel gear workpiece and without a tool change. Such methods are therefore particularly reliable and very accurate.

Methods are disclosed herein for machining the tooth flanks of a bevel gear workpiece, which may be, by way of example only, a crown gear workpiece. A gear-cutting tool is rotationally driven and plunged a predefined depth into a bevel gear workpiece to machine a concave tooth flank and a convex tooth flank of one or more tooth gaps of the bevel gear workpiece. Correction machining is also performed on the tooth flanks, which may include cutting free of the concave tooth flank, which may include rotating the workpiece in a first rotational direction a predefined first absolute value in relation to the gear-cutting tool, and/or cutting free of the convex tooth flank, which may include rotating the workpiece in another rotational direction a predefined second absolute value relative to the gear-cutting tool, thereby enlarging a gap width of the at least one tooth gap. Finish machining of the concave tooth flank may be performed, using a second machine setting that differs from the first machine setting, as well as may finish machining of the convex tooth flank, using a third machine setting that differs from the first and/or second machine settings.

In at least some embodiments, the cutting free and finish machining of the concave tooth flank occur substantially simultaneously using the second machine setting. In other embodiments, the cutting free and finish machining of the convex tooth flank occur simultaneously using the third machine setting. In some embodiments, the predefined first absolute value is identical or substantially identical to the predefined second absolute value.

In accordance with another aspect, the gear-cutting tool is transitioned from the first machine setting into the second machine setting while the gear-cutting tool is at least partially located in a tooth gap. In some embodiments, the gear-cutting tool is a cutter head gear-cutting tool and bar cutters or cutter inserts. In some embodiments, the bar cutters or cutter inserts have two cutting edges for machining the concave tooth flank and the convex tooth flank simultaneously. In other embodiments, part of each of bar cutter or inserts has a cutting edge for machining the concave tooth flank, and another part of the bar cutter or cutter insert has a cutting edge for machining the convex tooth flank.

In accordance with another aspect, the correction machining corrects flank angle errors (FWF) in the workpiece that occurred during previous machining, e.g., machining of the tooth flanks.

In another embodiment, the bevel gear workpiece is measured before performing the correction machining in order to detect flank angle errors (FWF) in the workpiece. In embodiments where multiple bevel gear workpieces are made, one of them is measured, and then correction machining is performed on multiple workpieces, e.g., based on the measurement.

In some embodiments, the machining process uses a single-indexing method or a continuous-indexing method. In the latter case, the bevel gear workpiece may be rotationally driven in a coupled manner with the rotational driving of the gear-cutting tool.

Other objects, features, and/or advantages will become apparent in view of the following detailed description of the embodiments and the accompanying drawings.

However, while various objects, features and/or advantages have been described in this summary and/or will become more readily apparent in view of the following detailed description and accompanying drawings, it should be understood that such objects, features and/or advantages are not required in all aspects and embodiments.

This summary is not exhaustive of the scope of the present aspects and embodiments. Thus, while certain aspects and embodiments have been presented and/or outlined in this Summary, it should be understood that the present aspects and embodiments are not limited to the aspects and embodiments in this summary. Indeed, other aspects and embodiments, which may be similar to and/or different from, the aspects and embodiments presented in this summary, will be apparent from the description, illustrations and/or claims, which follow.

It should also be understood that any aspects and embodiments that are described in this summary and do not appear in the claims that follow are preserved for later presentation in this application or in one or more continuation patent applications.

BRIEF DESCRIPTION OF THE DRAWINGS

Other advantages and features of the disclosed subject matter will become apparent from the following detailed description, which are to be understood not to be limiting and which will be described in greater detail hereafter with reference to the drawings, wherein.

DETAILED DESCRIPTION

Terms are used in conjunction with the present disclosure which are also used in relevant publications and patents. However, it is to be noted that the use of these terms is only to serve for better understanding. The inventive concepts and the scope of protection of the patent claims are not to be restricted in the interpretation by the specific selection of the terms. The invention may be readily transferred to other term systems and/or technical fields. The terms are to be applied accordingly in other technical fields.

Greatly varying gear-cutting tools 100 (for example, solid tools) having defined cutting edges and grinding tools (for example, cup grinding tools) can be used for machining the tooth flanks of bevel gear workpieces. Details of embodiments are described in conjunction with the following description, in which cutter head gear-cutting tools 100 are used, which comprise bar cutters or cutter inserts. A bar cutter or cutter insert can have, for example, two cutting edges, wherein one of these cutting edges is designed for the machining of the concave tooth flank 13.1 of a tooth gap 12 and the other of these cutting edges is designed for the machining of the convex tooth flank 13.2 of the tooth gap 12 in each case. The gear-cutting tools 100 can also comprise bar cutters or cutter inserts arranged in groups, however, in which one part of the bar cutters or cutter inserts have cutting edges for machining the concave tooth flank 13.1 and another part of the bar cutters or cutter inserts have cutting edges for machining the convex tooth flank 13.2.

However, what is described may also be transferred to other tools 100, which are designed for the gear cutting of bevel gear workpieces 10.

Such tools 100 and the corresponding gear-cutting machines are well known and have been used for many years in the gear cutting field.

Figure 2A:
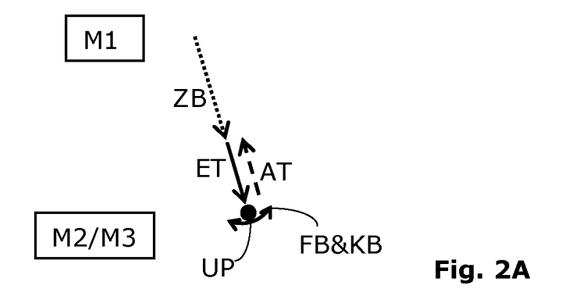
FIG. 2A shows a simplified, schematic illustration of a first modified plunging method.

The details of a first method are shown in summary in schematic form in FIG. 2A. This first method is also referred to here as the first modified plunging method.

The method is based in some embodiments on a classical plunging method, which was already described in conjunction with FIGS. 1A, 1B and 1C.

The dotted arrow in FIG. 2A illustrates the infeed movement ZB and the solid arrow, which is oriented in the direction of the crown gear workpiece 1 (not shown here), illustrates the plunging movement ET of the first modified plunging method.

After the tool 100 has reached the final plunging position, which is defined by the position of the tooth base on the crown gear workpiece 10, a method follows, which is referred to here as combined correction machining FB&KB. FIG. 2A indicates that the combined correction machining FB&KB comprises both cutting free FB, which is executed upon reaching or after reaching the plunging final position, and also correction machining KB, which takes place by changing/adjusting further variables of the machine setting.

The double arrow FB&KB has a slight curve in FIG. 2A, to illustrate that an adjustment of the machine setting takes place. The radius of curvature of this double arrow FB&KB is oriented in the direction of the tool 100 (not shown), to thus represent the adjustment of the machine setting. The adjustment of the machine setting is also indicated in that in addition to the double arrow FB&KB, the two machine settings M2 and M3 are mentioned in the figures.

The gap width is greater after the combined correction machining FB&KB than the tip width $s_{a0}$ of the tool 100. The tip width $s_{a0}$ is shown in FIG. 1B as the distance between the two cutting edges of the bar cutter 3.

The tool 100 is only drawn out of the tooth gap by a reverse-oriented movement AT after this combined correction machining FB&KB has been carried out by the adjustment of the machine settings. There is also a reversal point UP here.

Up to the execution of the reverse-oriented movement AT, in some embodiments, the tool 100 can remain a short time in the final position, so that more than only one bar cutter or cutter insert is guided in a chip-removing manner through the tooth gap.

Figure 2B:
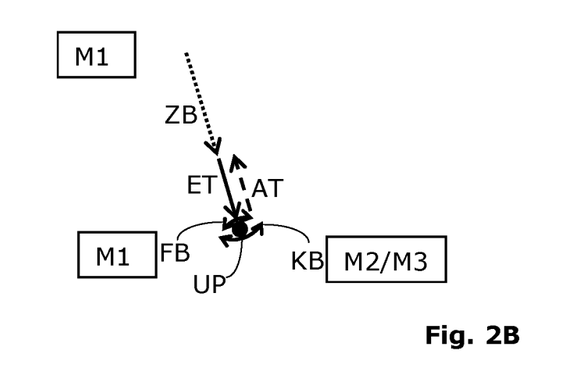
FIG. 2B shows a simplified, schematic illustration of a second modified plunging method.

FIG. 2B illustrates the details of a second method in schematic form in summary. Since this method is equivalent with respect to the infeed ZB, plunging ET, and withdrawal AT to the first method, reference is made in this regard to the description of FIG. 2A.

In contrast to the embodiment illustrated in FIG. 2A, the classical cutting free movements are illustrated in FIG. 2B by a separate double arrow FB. The cutting free is achieved in that the crown gear workpiece 10 executes a small workpiece rotation about the workpiece rotational axis R2 in one rotational direction (for example, in the clockwise direction) and in the opposite rotational direction (for example, counterclockwise). The double arrow FB therefore has a slight curvature in FIG. 2 to illustrate that it is a workpiece rotation about the workpiece rotational axis R2.

The workpiece rotation is executed with a predefined absolute value in one or in both rotational directions. The tooth gap 12 thus obtains an enlarged gap width. The gap width is greater here immediately after the classical cutting free than the tip width $s_{a0}$ of the tool 100.

In the second method, the cutting free takes place upon reaching or after reaching the plunging final position while maintaining the first machine setting M1. Solely the crown gear workpiece 10 completes a workpiece rotation during the classical cutting free. Therefore, the symbol M1 is shown directly adjacent to the reference sign FB in FIG. 2B.

Carrying out correction machining KB now takes place, e.g., as illustrated in schematic form in FIG. 2A by the separate double arrow KB. The double arrow KB has a slight curvature in FIG. 2B, to illustrate that the correction machining KB takes place by the adjustment of the machine setting(s). The radius of curvature of this double arrow KB is oriented in the direction of the tool 100 (not shown), to thus represent the adjustment of the machine setting(s).

A flank angle error, for example, or also other errors of the tooth flanks of the tooth gap can be intentionally corrected by this type of the correction machining KB, which takes place while the tool 100 is located in the tooth gap of the crown gear workpiece 10. The adjustment of the machine setting is indicated in FIG. 2B in that, in addition to the reference sign KB, a second machine setting M2 and a third machine setting M3 are mentioned.

The tool 100 is drawn by a reverse-oriented movement AT out of the tooth gap after this correction machining KB has taken place by the adjustment of the machine settings. There is also a reversal point UP here.

If either the single-indexing or the continuous-indexing plunging methods are applied, the workpiece rotation which is used for the cutting free takes place with an angle absolute value which is significantly less than the indexing p of the crown gear workpiece 10 to be machined. In contrast to the single-indexing plunging method, during the continuous-indexing plunging method, the crown gear workpiece 10 rotates in a synchronized (coupled) manner in a specific ratio to the tool speed (depending on the tooth count and the cutter head number of threads). This synchronized movement is overlaid during the workpiece rotation with a phase shift of the rotational angle of the workpiece. This phase shift is also significantly less than the indexing p.

The values indicated hereafter each relate to the crown wheel which was used to design the crown gear 10. Therefore, all symbols are provided with a subscript P.

Figure 3A:
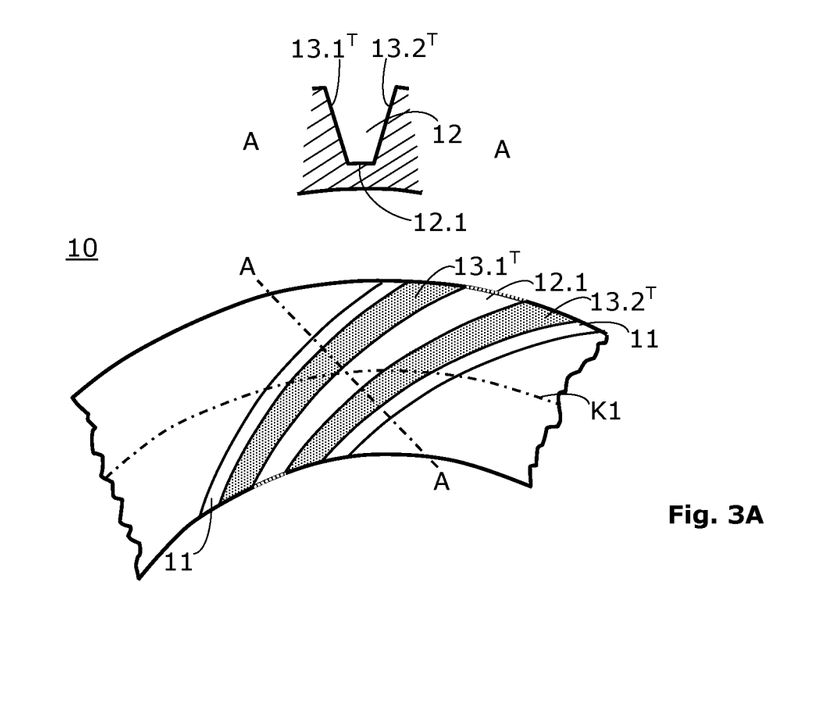
FIG. 3A shows, in the lower region, a schematic top view of a crown gear workpiece and, above this, a schematic sectional illustration along normal line A-A through a tooth gap which was pre-machined by plunging in the single-indexing method.

FIG. 3A shows a schematic top view of a section of a crown gear workpiece 10, on which a tooth gap 12 was pre-machined by conventional plunging in the single indexing method. Viewed from left to right, the illustration of the crown gear workpiece 10 comprises a tooth 11 (to be precise, it is the tooth head), a concave tooth flank 13.1, a tooth gap bottom having tooth base 12.1, a convex tooth flank 13.2, and a further tooth 11. The two tooth flanks 13.1, 13.2 are provided with a gray pattern to indicate that these flanks do not yet have the final form (the actual curve, or the actual topography, deviates from the setpoint curve, or the setpoint topography). They can have, for example, flank angle errors in the same direction, as already mentioned at the outset. To indicate that these are the tooth flanks after the plunging, the reference signs 13.1 and 13.2 are each provided with a superscript T. These are thus the tooth flanks $13.1^T$, $13.2^T$ after the plunging.

A normal section through a tooth gap 12 is shown in schematic form in the upper part of FIG. 3A, which was pre-machined by plunging in the single indexing method. The section extends along section line A-A.

Figure 3B:
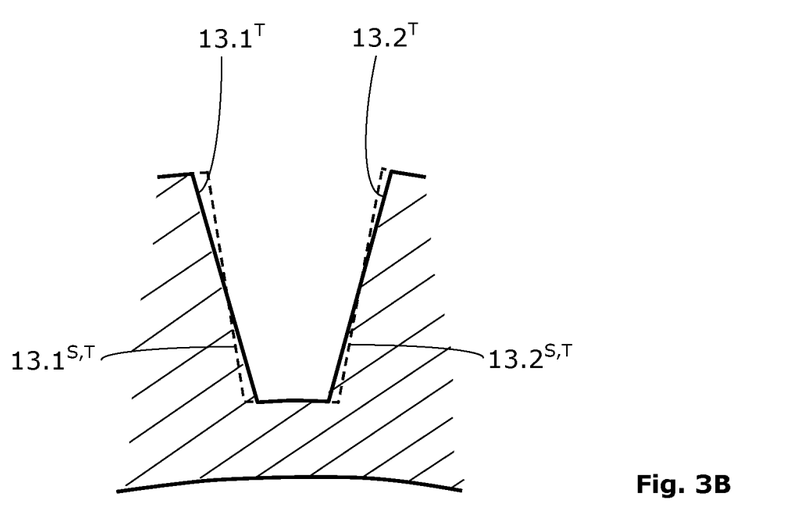
FIG. 3B shows the schematic illustration of FIG. 3A in an enlarged form, wherein, in addition to the actual curve of the flank lines after the plunging, the setpoint curve of the flank lines is shown.

FIG. 3B shows the sectional illustration of FIG. 3A in an enlarged form. In addition to the instantaneous actual curve of the plunge-machined tooth flanks $13.1^T$, $13.2^T$ (also called actual tooth flanks) the setpoint curve $13.1^{S,T}$, $13.2^{S,T}$ (also called setpoint tooth flanks after the plunging) of the two flanks is illustrated by dashed lines. In the case shown, the actual tooth flanks $13.1^T$, $13.2^T$ have a positive flank angle error FWF in relation to the setpoint tooth flanks $13.2^{S,T}$.

The flank angle error FWF is defined after the plunging as the difference between the setpoint curve $13.1^{S,T}$, $13.2^{S,T}$ and the actual curve of the tooth flanks $13.1^T$, $13.2^T$. A positive flank angle error FWF is an angle error here in which the dotted line, which is used to illustrate the setpoint curve $13.1^{S,T}$, $13.2^{S,T}$ in the direction of the tooth height, has a steeper slope than the actual curve of the tooth flanks $13.1^T$, $13.2^T$.

Figure 3C:
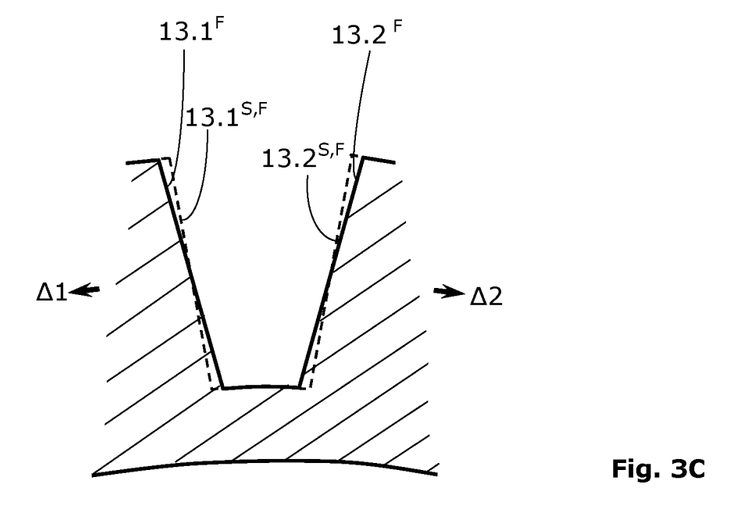
FIG. 3C shows the schematic sectional illustration of FIG. 3B, wherein in addition to the setpoint curve of the flank lines, the actual curve of the flank lines after the cutting free is shown.

FIG. 3C shows the state after the cutting free by a workpiece rotation by the angle absolute value |Δ1| in a first rotational direction and by the angle absolute value |Δ2| in the opposing, second rotational direction. Since this conventional cutting free takes place using the same gear-cutting tool and only a workpiece rotation of the bevel gear workpiece 10 is performed, the flank angle error FWF is retained. Only the gap width e of the tooth gap 12 is enlarged by a small absolute value by the cutting free. The instantaneous actual curve of the tooth flanks is identified by a superscript F, as follows $13.1^F$, $13.2^F$. The setpoint curve $13.1^{S,F}$, $13.2^{S,F}$ of the two flanks after the cutting free is illustrated by dashed lines.

The two short arrow tips identified with Δ1 and Δ2, which point in the clockwise direction and counterclockwise direction, respectively, illustrate the two workpiece rotations. The angle absolute value of the workpiece rotation may be equal in both rotational directions in some embodiments, i.e. |Δ1|=|Δ2|. The gap width e has been minimally expanded by the cutting free, which is hardly visible in comparison to FIGS. 3B and 3C.

The correction machining can be performed by changing the machine settings. The result after this correction machining is shown, for example, in FIG. 3D by the flank lines 13.1, 13.2. To indicate that the flank angle error FWF is equal to zero, or is nearly zero, the flank lines 13.1, 13.2 are shown in the form of interrupted straight lines in FIG. 3D.

It is to be noted that FIGS. 3A, 3B, 3C and 3D are of a schematic nature, and certain aspects have not been shown to scale, to make them visible at all. The tooth shape and the curve of the tooth base 12.1 are also illustrated.

The flank angle error FWF discussed here is an error which can be determined point by point on each tooth flank 13.1, 13.2 by measurement. Since these are flank angle errors FWF which have been induced by the plunging using the first machine setting M1, the flank angle error FWF along each of the tooth flanks 13.1 and 13.2 is constant in the flank longitudinal direction.

The illustration of FIGS. 3A, 3B, 3C and 3D can thus also be transferred to other positions along the tooth flanks 13.1, 13.2, since the flank angle error FWF is constant, as just mentioned.

The flank angle errors FWF, which can be remedied according to methods disclosed herein, are flank angle errors FWF, which are each measured in the vertical direction of the teeth 11.

The illustration of FIGS. 3A, 3B, 3C and 3D is based on a second method approach, in which the cutting free FB takes place separately from the correction machining KB, as shown in FIG. 2B.

Figure 3D:
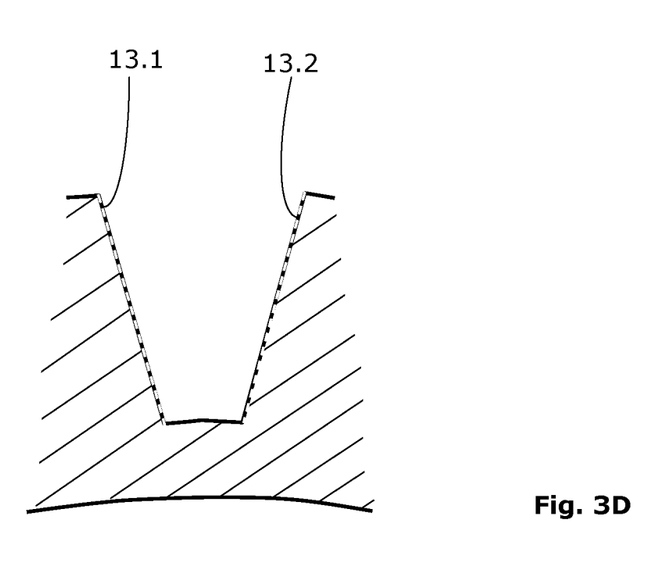
FIG. 3D shows the schematic sectional illustration of FIG. 3C, wherein the final curve of the flank lines is shown.

However, the illustration of three steps in FIGS. 3B, 3C, and 3D was selected because this type of illustration enables the partial aspects to be illustrated and described and because this form of illustration is simpler and more comprehensible than a superimposed illustration of interlocking steps.

The first modified plunging method, in which the cutting free and the correction machining take place jointly, is illustrated in FIG. 2A.

What is described here may be applied to single-indexing methods, in which machining is performed tooth gap 12 by tooth gap 12 as shown in FIG. 2A or 2B, as well as to continuous-indexing methods, in which all gaps are subjected to the same plunging step followed by the correction machining method.

The adjustment of the machine setting relates here in some embodiments to the adjustment of at least one variable in addition to the workpiece pivot $\Delta$.

In a simplified special case, for example, in addition to the workpiece pivot $\Delta$, the cradle angle $\alpha$ can also be changed in a first direction (referred to as second machine setting M2 here), to correct one concave tooth flank $13.1^T$ (in the single-indexing method) or all concave tooth flanks $13.1^T$ (in the continuous-indexing method). For the correction machining of one convex tooth flank $13.2^T$ (in the single-indexing method) or all convex tooth flanks $13.2^T$ (in the continuous-indexing method), the cradle angle $\alpha$ is then changed in an opposing direction.

The differences of the three different machine settings M1, M2, M3 will be summarized once again on the basis of this simplified special case. In the first machine setting M1, the cradle angle is $\alpha=\alpha1$ and during the plunging the depth position $\chi$ is changed, for example, from a starting depth position $\chi0$ to $\chi1$. The absolute value of this change is identified with ET in FIG. 1B.

The second machine setting M2 differs in the simplified special case from the first machine setting M1, for example, by way of a different cradle angle $\alpha2\neq\alpha1$ and by way of a workpiece pivot $-\Delta$. The depth position $\chi$ remains, for example, unchanged, i.e., $\chi2=\chi1$.

The third machine setting M3 differs in the simplified special case from the first and second machine settings M1 and M2, respectively, for example, by way of a different cradle angle $\alpha3\neq\alpha2\neq\alpha1$ and by way of a workpiece pivot $+\Delta$. The depth position $\chi$ remains, for example, unchanged, i.e., $\chi3=\chi1=\chi2$.

The transition of the cutter head gear-cutting tool 100 from the first machine setting M1 into the second machine setting M2 may take place while the cutting edges of the cutter head gear-cutting tool 100 are located in the tooth gap 12. Similarly, the transition of a grinding tool from the first machine setting M1 into the second machine setting M2 can also take place while the abrasive surfaces of the grinding tool are located in the tooth gap 12.

It is well known to a person skilled in the art in gear cutting that changing or adjusting a single variable of the machine setting of the gear cutting model can run to the adjustment of two or more than two variables in a real gear-cutting machine. This is because, inter alia, these are relative adjustments, which can often be executed more rapidly if, for example, the bevel gear workpiece 10 and the gear-cutting tool 100 are moved. Moreover, not every one of the available machines images the axes of the gear cutting model with 1:1 accuracy, but rather the axial constellations can sometimes be quite different.

The bevel gear workpiece 10 can be subjected to a measurement after the plunging and before carrying out the correction machining, to detect flank angle errors FWF and ascertain the size thereof.

However, one bevel gear workpiece 10 of a series of bevel gear workpieces can also be subjected to a measurement after the chip-removing machining in the plunging method, to then subsequently execute the correction machining in further bevel gear workpieces of the series of bevel gear workpieces.

As may be recognized by those of ordinary skill in the pertinent art based on the teachings herein, numerous changes and modifications may be made to the above-described and other embodiments without departing from the spirit and/or scope of the invention. Accordingly, this detailed description of embodiments is to be taken in an illustrative as opposed to a limiting sense.

What is claimed is:

1. A method for machining the tooth flanks of a bevel gear workpiece comprising the following steps:
    a) rotationally driving a gear-cutting tool and machining a bevel gear workpiece using a chip removal process including plunging the gear-cutting tool into the workpiece using a first machine setting up to a predefined depth into material of the bevel gear workpiece to machine a concave tooth flank and a convex tooth flank of at least one tooth gap of the bevel gear workpiece, and
    b) performing a correction machining of the concave tooth flank and the convex tooth flank of the at least one tooth gap including
        (i) one or more of (1) cutting free the concave tooth flank including rotating the workpiece in a first rotational direction to an angle defined by a predefined first absolute value relative to the gear-cutting tool; or (2) cutting free the convex tooth flank including rotating the workpiece in another rotational direction to an angle defined by a predefined second absolute value relative to the gear-cutting tool, thereby enlarging a gap width of the at least one tooth gap, and
        (ii) finish machining the concave tooth flank using a second machine setting, which differs from the first machine setting, and
        (iii) finish machining the convex tooth flank using a third machine setting, which differs from the second machine setting.

2. The method according to claim 1, including performing the steps of cutting free the concave tooth flank and finish machining the concave tooth flank simultaneously and using the second machine setting.

3. The method according to claim 1, including performing the steps of cutting free the convex tooth flank and finish machining of the convex tooth flank simultaneously and using the third machine setting.

4. The method according to claim 1, further including transitioning the gear-cutting tool from the first machine setting into the second machine setting while the gear-cutting tool is partially located in the at least one tooth gap.

5. The method according to claim 1, including cutting free the concave tooth flank and cutting free the convex tooth flank, wherein the predefined first absolute value is identical to the predefined second absolute value.

6. The method according to claim 1, wherein the gear-cutting tool defines a cutter head gear-cutting tool defining bar cutters or cutter inserts, wherein each of the bar cutters or cutter inserts defines two cutting edges configured to machine the concave tooth flank and the convex tooth flank simultaneously during the step of machining the bevel gear workpiece using a chip removal process.

7. The method according to claim 1, wherein the gear-cutting tool defines a cutter head gear-cutting tool defining bar cutters or cutter inserts, wherein a part of each of the bar cutters or cutter inserts defines a cutting edge configured to machine the concave tooth flank during the step of machining the bevel gear workpiece using a chip removal process, and wherein another part of each of the bar cutters or the cutter inserts defines a cutting edge configured to machine the convex tooth flank during the step of machining the bevel gear workpiece using a chip removal process.

8. The method according to claim 1, wherein the correction machining step includes correcting flank angle errors in the workpiece oriented in a same direction that occurred during the step of machining the bevel gear workpiece using a chip removal process.

9. The method according to claim 1, further including measuring the bevel gear workpiece before performing the correction machining step, wherein the measuring step is adapted to detect flank angle errors in the workpiece.

10. The method according to claim 1, wherein the bevel gear workpiece is one bevel gear workpiece of a series of bevel gear workpieces, and the method further includes measuring the bevel gear workpiece after the step of machining the bevel gear workpiece using a chip removal process, and then subsequently performing correction machining of further bevel gear workpieces of the series of bevel gear workpieces.

11. The method according to claim 1, wherein said plunging defines a single-indexing process or a continuous-indexing process.

12. The method according to claim 11, wherein said plunging defines a continuous-indexing process, and the method further includes coupledly rotationally driving the bevel gear workpiece with said rotational driving of the gear-cutting tool.

13. The method according to claim 1, wherein the bevel gear workpiece defines a crown gear workpiece.

* * * * *